M. B. RYAN.
METHOD OF MAKING WELDED CHAIN.
APPLICATION FILED OCT. 23, 1912.

1,093,207.

Patented Apr. 14, 1914.

Witnesses:

Inventor
M. B. Ryan,
By his Attorneys

UNITED STATES PATENT OFFICE.

MICHAEL B. RYAN, OF BRIDGEPORT, CONNECTICUT.

METHOD OF MAKING WELDED CHAIN.

1,093,207.  Specification of Letters Patent.  Patented Apr. 14, 1914.

Application filed October 23, 1912. Serial No. 727,288.

*To all whom it may concern:*

Be it known that I, MICHAEL B. RYAN, of Bridgeport, in the county of Fairfield and in the State of Connecticut, have invented a certain new and useful Improvement in Methods of Making Welded Chain, and do hereby declare that the following is a full, clear, and exact description thereof.

The object of my invention is to provide a method of electrically welding ends together as in the art of making welded chain links or rings which shall possess, among others, the advantages of producing a welded joint in the link, which joint shall not be substantially greater in diameter than the rest of the link body, but which will be stronger at its welded joint than previous electrically welded joints of the same dimensions; and to that end my invention consists in the welding method hereinafter specified.

The invention is capable of embodiment in many different machines and forms, and the method therefore, is not to be restricted to any one form.

In the accompanying drawings forming part of this specification, I am illustrating diagrammatically the steps and instrumentalities employed in the formation of a welded link.

Figure 1:
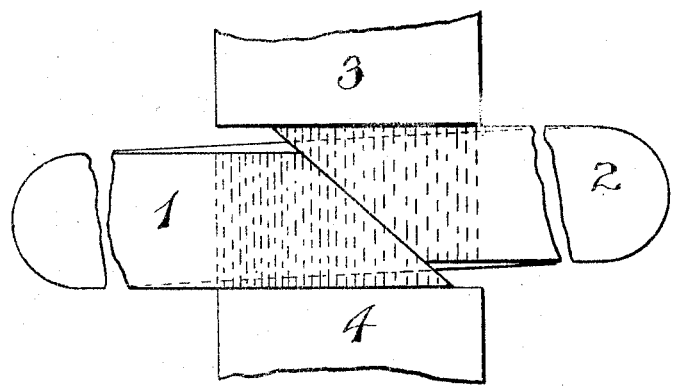
Figure 2:
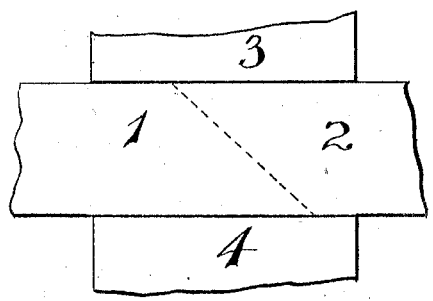
Figure 3:
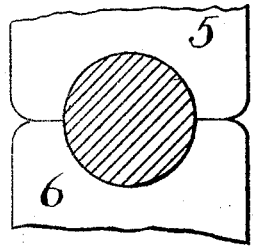

In these drawings: Figure 1 is an edge view of a chain link conventionally showing welding electrodes in operative position relatively thereto, that is to say in the starting position. Fig. 2 is a diagrammatic view showing the electrodes in the completed welding position relative to the welded link. Fig. 3 illustrates the welded link joint in position between finishing instrumentalities.

Prior to the present invention, electrically welded chain links have been welded usually by butt welding—that is, by forming the ends to be welded with flat surfaces which are perpendicular to the plane of the link. In welding such a joint, the heating begins at the center of the joint and gradually travels from such center toward the periphery of the link ends, and then starts to eat back into the link ends radiating in all directions from such center, thus forming cup-shaped masses of soft metal surrounded by a rim of less soft metal. In this old method, it is necessary to press the link ends longitudinally so as to maintain contact, and to keep up that pressure as the metal softens in order to secure the welding of the ends and provide the required "upset." This pressure forces the soft metal around the edges of the ends outwardly, making a ring around the joint extending beyond the normal exterior surface of the link body and forming an enlargement, this enlargement usually being formed of partly melted molecules of sulfur and phosphorus impurities that melt at a lower heat than the body of the metal and which are forced outwardly beyond the normal circumference of the link body in the process of applying pressure. The material of this enlargement is of such a relatively soft structure and might be described as "crummy." Butt-welding, therefore, produces an enlargement or ring around the edges of the link joint at the point of weld. This ring is objectionable not only on account of looks, but because it interferes with the unrestrained use of the chain, such for instance as in passing it over, or through, pulley blocks. Heretofore it has been sought to remove this enlargement or ring by compressing the joint between semi-cylindrical dies or other pressure applying instrumentalities. This, however, only crowds the "crummy" material down into the joint tending to expand and weaken the same, which is further weakened because of the fact that the metal in the cup-shaped area is quite apt to be of a "spongy" structure. In my process I overcome these difficulties.

My method, as practised, consists in forming the link members or units so that their contacting end faces are oblique to the plane of the link, preferably as shown in Fig. 1 of the drawings. Before the ends of the links are to be welded they are overlapped and slightly "overset" as shown in said figure of the drawings. This can be effected in the formation of the link during the bending operation. When the link ends are in the position shown in Fig. 1, pressure is applied thereto transversely to the plane of the beveled faces and at the same time, an electric welding current is passed through the link ends, the pressure continuing until the ends are forced into substantial alinement. In the drawings, 1 and 2 designate the beveled overlapping ends of the link member and 3 and 4 designate electrode members which are pressed toward each other and in a direction transversely to the plane of the bevel and also at right angles to the plane of the link. These electrodes being forced together press the link ends into line with each other, "working" and wiping the metal longitudinally, knitting it together and giving to the fibers a longitudinal lay instead of forming a relative "spongy" area of metal at the joint as in the butt-welding process. I find that the application of a yielding pressure to the welding instrumentalities gives best results, as it enables the welding electrodes to follow the link ends as the latter soften and move into alinement.

In the drawings, Fig. 1, the heated portions of the link ends are represented by dotted lines, and in Fig. 2 I have indicated the approximate zone of the welded joint by a dotted line, although it will be understood that the line of junction wholly disappears owing to the flow or run of the metal during the forming process.

In order to give the link a finished appearance, I may, if desired, apply a finishing and final shaping pressure to the link in the zone of the weld and preferably while the link retains some portion of its welding heat and is, therefore, somewhat soft and easily shaped. The pressing and shaping instrumentalities are shown conventionally in the drawings in Fig. 3 at 5 and 6.

What I claim, therefore, and desire to secure by Letters Patent is:

1. The method of welding overlapping beveled ends of metal which consists in oversetting said beveled ends to extend partially beyond each other, and applying electric welding heat to said ends with pressure transversely of the plane of the beveled heated ends and in a direction to press said heated ends into alinement.

2. The method of welding overlapping beveled ends of metal which consists in oversetting said beveled ends to extend partially beyond each other, and applying electric welding heat to said ends with pressure transversely of the plane of the beveled heated ends and in a direction to press said heated ends into alinement, and then applying finishing shaping pressure to the welded joint.

3. The method of welding overlapping beveled ends of metal which consists in oversetting said beveled ends to extend partially beyond each other, and applying electric welding heat to said ends with pressure transversely of the plane of the beveled heated ends and in a direction to press said heated ends into alinement, and then applying finishing shaping pressure to the welded joint while the latter is still soft from welding heat.

4. The method of welding beveled overlapping ends of metal which consists in oversetting said ends to extend partially beyond each other, and applying electric welding heat to said ends with yielding pressure transversely of the plane of the bevel of the heated ends and in a direction to press said heated ends into alinement.

5. The method of welding beveled overlapping ends of metal which consists in oversetting said ends to extend partially beyond each other and applying simultaneously to said ends electric welding heat and pressure transversely of the plane of the bevel of said heated ends and in a direction to press said ends into alinement.

6. The method of welding beveled overlapping ends of metal which consists in oversetting said ends to extend partially beyond each other and applying simultaneously to said ends electric welding heat and yielding pressure transversely of the plane of the bevel of said heated ends and in a direction to press said ends into alinement.

7. The method of welding beveled overlapping ends of metal which consists in oversetting said ends to extend partially beyond each other and applying simultaneously to said ends electric welding heat and pressure transversely of the plane of the bevel of said heated ends and in a direction to press said ends into alinement, and then applying finishing shaping pressure to the welded joint.

8. The method of welding the beveled overlapping ends of a metal link which consists in oversetting the ends of said link and then applying electric welding heat to said ends with pressure transversely of the plane of said bevel and in a direction to press said ends into alinement.

9. The method of welding the beveled overlapping ends of a metal link which consists in oversetting the ends of said link and then applying electric welding heat to said ends with pressure transversely of the plane of said bevel and in a direction to press said ends into alinement, and then applying finishing shaping pressure to the welded joint.

10. The method of welding beveled overlapping ends of metal links which consists in oversetting the beveled ends of said link ends and then applying simultaneously to said ends electric welding heat and pressure transverse to the plane of said bevel until said ends are forced into alinement.

In testimony that I claim the foregoing I have hereunto set my hand.

MICHAEL B. RYAN.

Witnesses:
H. J. LE MAIRE,
ELIZABETH M. SOLEN.